United States Patent [19]

Wood

[11] 4,158,780
[45] Jun. 19, 1979

[54] POWER GENERATION SYSTEMS IN BUOYANT STRUCTURES

[76] Inventor: Eric Wood, 42 Haggs Hill Rd., Ossett, West Yorkshire, England

[21] Appl. No.: 789,201

[22] Filed: Apr. 20, 1977

Related U.S. Application Data

[63] Continuation of Ser. No. 656,042, Feb. 6, 1976, abandoned.

[30] Foreign Application Priority Data

| Feb. 6, 1975 | [GB] | United Kingdom | 05196/75 |
| Sep. 10, 1975 | [GB] | United Kingdom | 37189/75 |
| Oct. 31, 1975 | [GB] | United Kingdom | 45183/75 |

[51] Int. Cl.² ............................................. F03B 13/10
[52] U.S. Cl. ........................................ 290/42; 290/53; 417/332; 417/337; 60/501
[58] Field of Search .............. 290/53, 54, 42, 43; 417/231, 330, 331, 332, 337; 416/84–86; 60/495–497, 398, 501, 487

[56] References Cited

U.S. PATENT DOCUMENTS

| 1,648,000 | 11/1927 | Lee | 60/487 |
| 3,928,967 | 12/1975 | Salter | 417/332 |
| 4,048,512 | 9/1977 | Wood | 290/53 |

OTHER PUBLICATIONS

*Wave Power*, S. H. Salter, from Nature, vol. 249, Jun. 21, 1974, pp. 720–724.

*Primary Examiner*—Robert K. Schaefer
*Assistant Examiner*—M. K. Mutter
*Attorney, Agent, or Firm*—Fred Philpitt

[57] ABSTRACT

A power generation system for the generation of electrica power from wave motions of the sea comprising a spine on which a plurality of ducks are rockably mounted and for each duck a power generation assembly comprising a hydrostatic transmission having a pump operatively connected with a drive which is rotated back and forth by the rocking motion of the duck, caused by the wave motions of the sea and a variable displacement motor hydraulically coupled to the pump so as to be driven by the pump. The system further includes an electric generator operatively connected to the motor to be driven thereby so as to provide electrical power and a sensing means for sensing the force or velocity condition of the duck and for varying the motor displacement in accordance with such condition.

8 Claims, 16 Drawing Figures

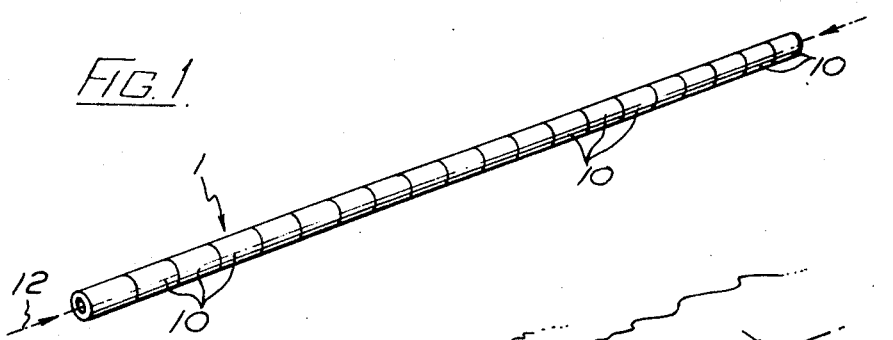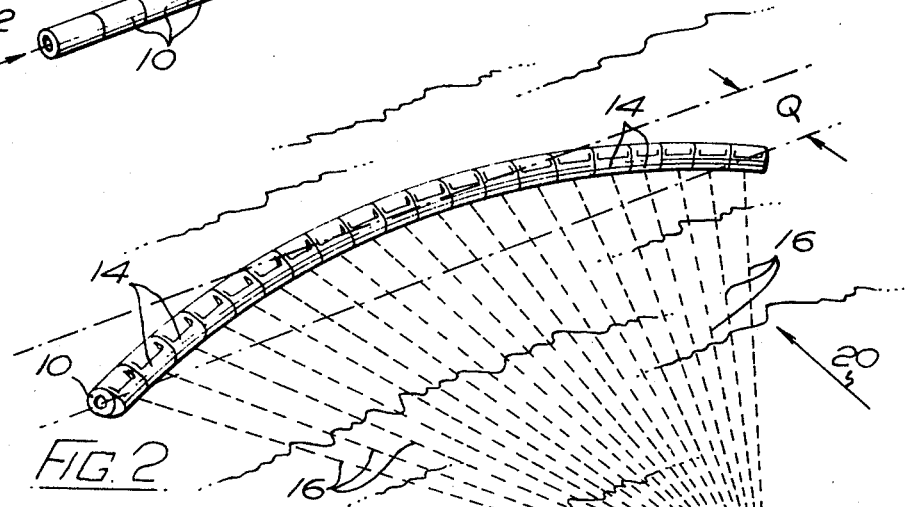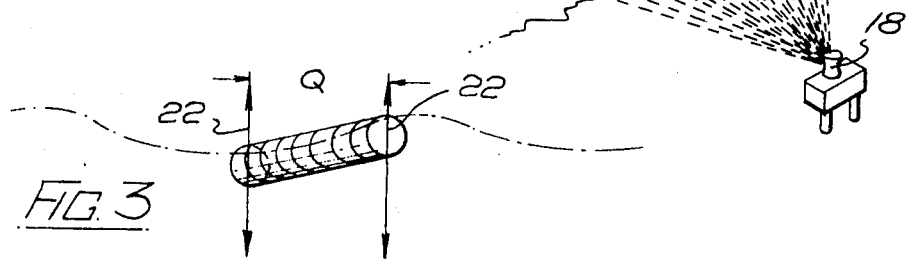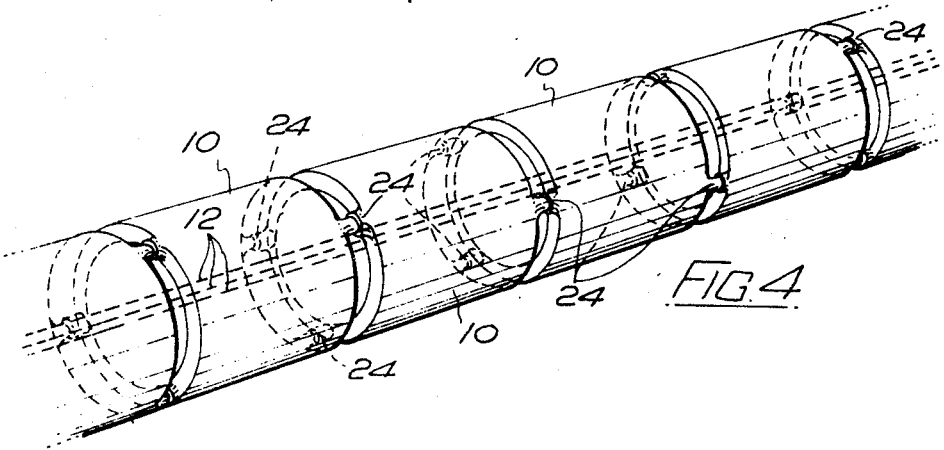

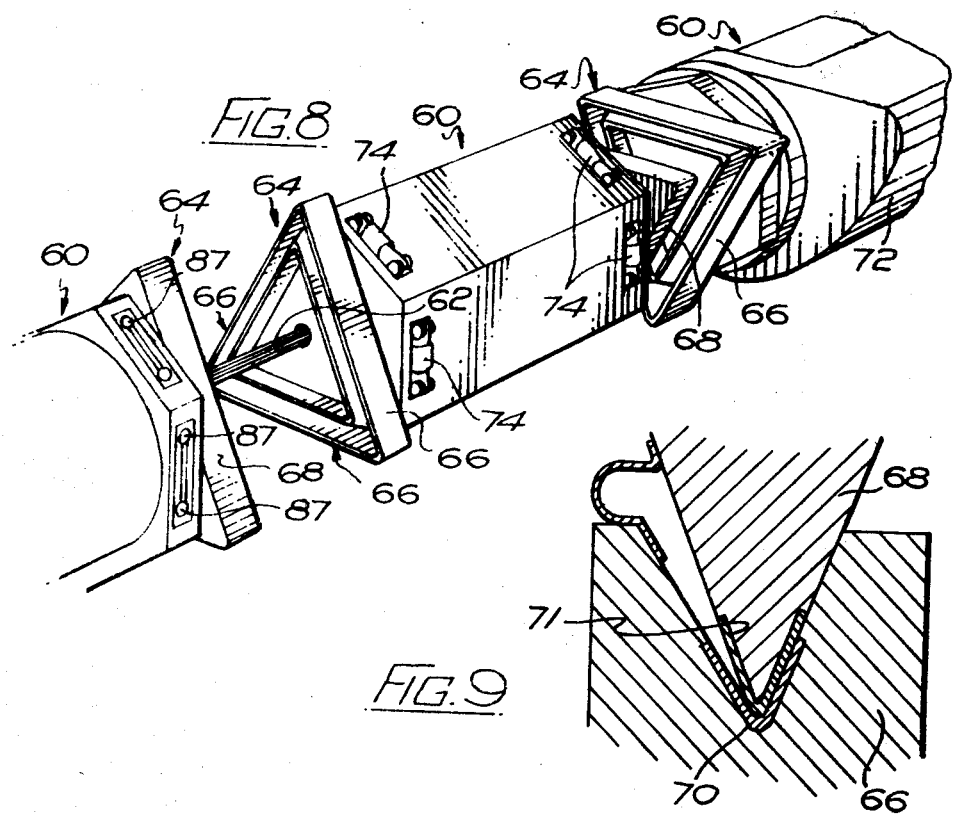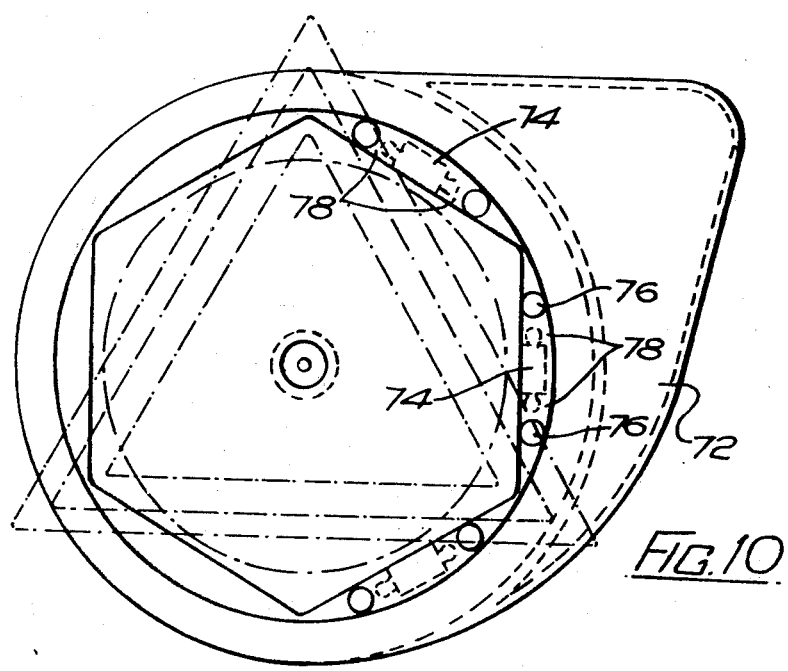

POWER GENERATION SYSTEMS IN BUOYANT STRUCTURES

This is a continuation of U.S. application Ser. No. 656,042, now abandoned, filed Feb. 6, 1976 which claims the priority of British Application Nos. 05196/75 filed Feb. 6, 1975; 37189/75 filed Sept. 10, 1975; and 45183/75 filed Oct. 31, 1975.

This invention relates to power generating systems, and in particular concerns a system and a method for generating power from wave motions of the sea. It also relates to electricity when generated by the system or method.

With the world-wide demand for new sources of energy, much concentration has been devoted to a means for harnessing the power available in sea wave motions, and in particular suggestion prime mover is essentially floated on the sea, but has freedom only to rock about a defined axis, the principle being that the energy is derived from this rocking motion. The prime mover has been referred to as a "duck" which is apt in view of the bobbing motion which it is anticipated the prime mover will execute, and where the expression "duck" is used in this specification, such a prime mover is intended.

At present, laboratory units using ducks have been built and tested, and generally speaking each such unit has a duck having a frontal lobe or nose portion which faces incoming waves and at the rear, the leeward side of the waves, the duck is shaped to have minimum or zero displacement of water as the duck rocks. The present invention aims at providing a system and method which use a rocking duck and by which electrical power can be generated from the wave motions of the sea in an efficient manner.

According to the present invention there is provided a power generation system for the generation of electrical power from the wave motions of the sea comprising a mounting on which a duck is rockably mounted and a power generation assembly comprising a hydrostatic transmission having a pump connected operatively with the duck so as to be driven by the rocking motion of the duck, caused by the wave motions of the sea, a variable displacement hydraulic motor hydraulically coupled to the pump so as to be driven by the pump and an electrical generator operatively connected to the motor to be driven thereby so as to provide output electrical power.

Also according to the invention there is provided a method of generating electrical power from the wave motions of the sea in which a duck rocks back and forth on a mounting as it comes under the influence of the wave motions of the sea and such rocking of the duck causes operation of a hydraulic pump of a hydrostatic transmission which in turn causes driving of a variable displacement hydraulic motor of the transmission which in turn drives an electrical generator to provide the output electrical power.

The invention furthermore provides electrical power generated by the system or method as aforesaid.

Embodiments of the invention will now be described by way of example with reference to the accompanying diagrammatic drawings, wherein:

FIG. 1 is a perspective view of a string of spine elements defining a spine for the support of ducks.

FIG. 2 is a perspective view showing the spine of FIG. 1 with ducks mounted thereon and in the in use position;

FIG. 3 is a side view of the spine as shown in FIG. 2 but without the ducks;

FIG. 4 is an enlarged perspective view of a section of the spine shown in FIGS. 1 and 2.

FIG. 8 is an enlarged and exploded perspective view of a section of another form of spine;

FIG. 9 is a sectional view showing one of the knuckle joints between the spine elements of the spine section illustrated in FIG. 8.

FIG. 10 is a side view of the spine section shown in FIG. 9 and also shows how the ducks are mounted thereon;

Figure 5:
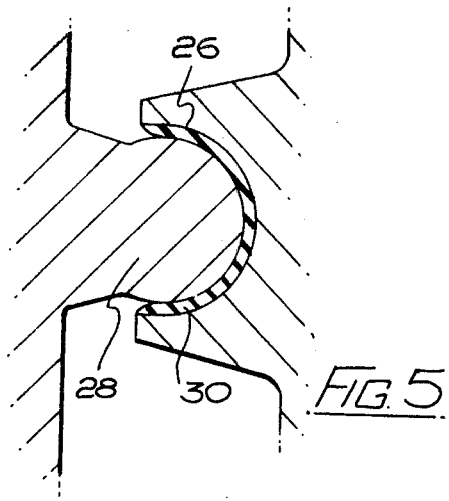
FIG. 5 is a sectional view showing one of the knuckle joints of the spine section shown in FIG. 4.

Referring to the drawings, and firstly to FIG. 1, in this figure there is shown a spine 1 of spine elements 10, the elements being pressed towards each other by means of tension cables 12, such as 'parafil' ropes. In FIG. 2 the spine is shown in the in use position at sea and each element 10 in this example is provided with its own power generating duck 14 which is rockable on the element 10 in sympathy with the wave motions of the sea which bouyantly supports the assembly. In another example only some of the elements 10 will be provided with the ducks 14. The power units each comprising a spine element 10 and its associated duck 14 are anchored by anchorage wires 16 to a single anchorage location 18. They may be anchored individually to individual anchors.

It will be noted that the spine in the in use position is curved, although this is not essential to the invention and in some cases the spine desirably will be straight.

In this example, the spine is curved to define an arc of a circle, although this is not necessary provided that the curvature remains in one direction i.e. all positive or all negative. The curvature is concave towards the direction of wave movement (arrow 20 in FIG. 2) although again this is not necessary and the curvature could be convex towards the waves if desired.

The curvature of the spine is such that, considering the ends of the spine to be connected by a straight line so that the spine and line define a sector of a circle, the sector height Q in FIG. 2 is ⅛ of the average length of the wave-length of the waves which can be expected in normal conditions.

An advantage in making the spine curved is that it will have in essence a finite length in the direction of wave motion, albeit that it is a third of a wave length, so that the front and rear of the spine can displace relatively under the wave action.

Referring to FIG. 3 of the accompanying drawings, in this connection the spine 1 may typically be of a length of 1 kilometer. The arrows 22 indicate how the front and rear of the spine, in the side elevation of FIG. 3 can lift and lower with the wave motions of the sea. The front portion is shown as being higher than the rear portion, but this will be reversed as the wave passes the spine. This curving of the spine has the advantage that creation of excessive bending movements on the spine when it is in use, is avoided.

The chord height Q is shown in FIGS. 2 and 3 typically may be 25 meters when the spine is for use in the North Atlantic. This chord height is approximately ⅛ of the average typical wave in the North Atlantic.

Referring now to FIGS. 4 and 5, the spine elements are generally cylindrical components or shells which are pressed end to end by the tension cables. The tension cables may exert a force of the order 600° tons where the shells are of the order of 30 feet in diameter. The spine elements 10 are interconnected at their adjacent peripheries by means of knuckle joints 24 of the like.

In this example, adjacent shells 10 which may be fabricated in concrete, are interconnected by three knuckle joints 24 these joints being equiangularly spaced relative to the axis of the spine and each joint being of the form shown in FIG. 5. Referring to FIG. 5 it will be seen that each joint comprises a socket formation 26 and a ball formation 28, the socket formation 26 having a generally spherical recess in which the ball 28 is accomodated. Said recess is lined with a layer 80 of rubber, or rubber like material. It is to be noticed that the ball 28 has a degree of tilting freedom relative to the socket recess. This is to enable adjacent shells 10 to tilt one relative to the other in the event of more than a pre-set loading being applied on the spine. Thus, consider one of the junctions between adjacent elements, and if one considers three imaginary lines such as lines A, B and C shown in FIG. 7 connecting the centres of the knuckle joints, thereby defining an equilateral triangle, the spine can tilt in any one of the two directions normal to each side of that triangle upon appropriate loading of the spine. The tension cables desirably should be located so that the centre of force exerted by the cables lies on the centroid of such triangle and at least within the triangle. As the spine is loaded, it must initially overcome the pre-tension applied by the cables 12, before there can be relative tilting between the elements and tilting will take place without much further loading. This is the desired characteristic of a spine of this nature. It must no yield or tilt under normal loading but when excess wave motions or sea conditions being experienced by the spine it must yield if it is not to be seriously damaged.

In this embodiment of the invention, the notional equilateral triangle of respective couplings lengthwise of the spine, are angularly staggered by 80° so that it takes a length of 4 spine elements before the equilateral triangle again becomes angularly coincident, with an initial position and every fifth spine element is similarly positioned. Because of the provision of this staggering, the spine in effect behaves like a universal joint in bending upon experiencing excess loading.

This gives the spine freedom of flexure under excess loading, effectively in any direction, which is extremely desirable.

It is to be appreciated that a larger number of knuckle joints can be used as desired, and the angular staggering can be eliminated or varied depending upon design and other conditions.

Figure 5A:
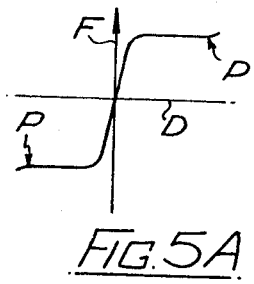
FIG. 5A shows the force deflection characteristic of the spine in FIG. 1 in in use condition.

FIG. 5A is a graph illustrating the Force (F)/Deflection (D) characteristics of the spine described above, as regards the bending of the spine under load conditions. In normal seas the spine will bend only relatively little and linearly with force up to and predetermined excess loading as may be encountered in high seas, when the loading applied by the tension cables is overcome and the spine bends freely about the appropriate one or more of the twelve axes discussed above depending upon the direction of the loading. Such loading will exist only for a short period i.e. part of the wave period of the wave motions of the sea, and when the excess loading is removed, the spine returns to its normal condition under the loading of the cables, and thereby permanent damage to the spine is avoided. It has been shown that this deflection under excess loading need not be very great, but is essential for safeguarding the spine.

Figure 6:
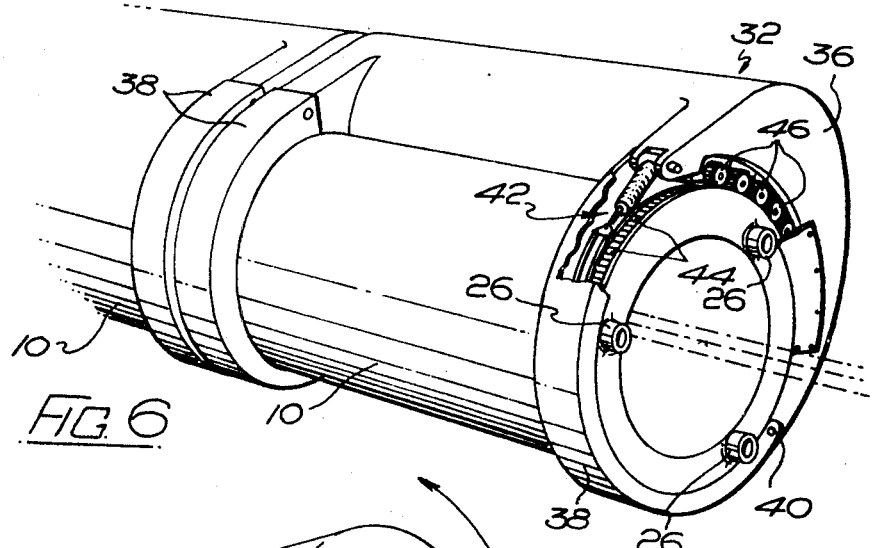
FIG. 6 is an enlarged perspective view of a section of the spine shown in FIG. 1 and also shows how the ducks are mounted thereon.
Figure 7:
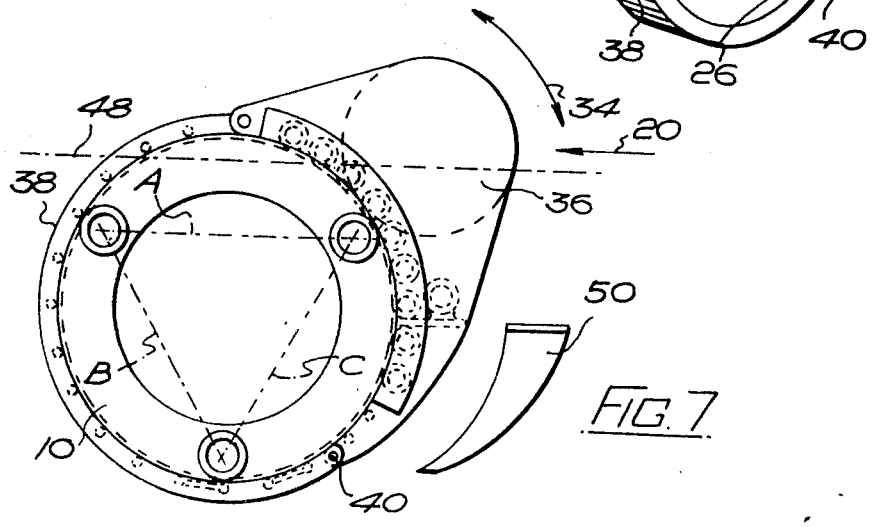
FIG. 7 is a side elevation showing the spine section shown in FIG. 6.

Each element 10 as best shown in FIGS. 6 and 7 mounts a duck 32 which is rockable about the axis of the element in the manner indicated by arrow 34 in FIG. 7. The duck preferably is of the construction set out in U.S. Pat. No. 3,928,967 to Stephen Salter. Each duck comprises a lobe portion 36, which meets the incoming wave, and two circular strap portions 38 at the rear the strap portions 38 being peripherally connected to the lobe portion 36 at pivot points 40, and the other ends to the straps 38 being anchored to the lobe portion releasably by anchorage means 42. As the strap portions are circular they will have no water displacement leeward of the duck. Each of the strap portions and lobe portion 38 and 36 respectively define a circular aperture in which is located one end of the element. The strap has internally a plurality of idler rollers which bear upon the end of element 10 so that the ducks can rock freely in use. The ends of element 10 may suitably be formed as races to facilitate the rocking of the ducks. It is to be noted that the two strap portions 38 are similarly connected to each duck, which respectively encircle the two ends of the element 10.

Each end of the element is provided peripherally with rings of gearteeth 44 (not shown in previous figures) which are engaged by toothed rotors 46 (see FIG. 3) and each rotor 36 is drivingly connected to a hydraulic pump, in particular a swash plate pump, carried by the lobe portion 22, whereby the power is derived from the units. The pumps are each connected to drive a flywheel and a hydraulic motor, also of the swash plate type.

The motors are connected to the opposite ends of the shaft of an electric alternator which in turn feeds a transformer through electrical transmission lines extending lengthwise of the spine. The transformer output is taken to a high voltage rectifier from which a DC electric power supply is obtained, and this can be delivered by cable to a suitable power take-off location, for example a power take-off location on land. The power generating assemblies described above are, in this example, carried by and in the lobe portion 36. The power is generated by the motion of waves impinging upon the lobe portion 36, the direction of the travelling waves being indicated by arrow 20 in FIG. 2 and FIG. 7. These waves cause the lobe portions 36 to rock about there mounting elements 10 driving the swash plate pumps by virtue of the interaction of the rotors 46 with the toothed rings 44. It will be appreciated that the swash plates of the motors are automatically reversed in angle to give a uni-directional output, despite the back and forth rocking movements of the lobe portions 36. The strap portions 38 also rock, but have no displacement of water at the leeward side of the spine, If, instead of constructing the elements of cylindrical shells, they are formed as cages comprising two end rings interconnected by bars, it will be appreciated that the water can pass through the cages and fill the cages, and this in some cases may be advantageous, as the cages can be made readily of the correct buoyancy so as to sit in a desired and more or less constant position in relation to the water level. An expected duck position in relation to the water level is indicated clearly in FIG. 7 the water level being indicated at 48. As the ducks give up potential energy as they fall, the lobe portions 36 have ballast, such ballast concrete masses 50 as indicated in FIG. 7 added thereto.

As an alternative to constructing the spine elements as cages they may be cylindrical bodies having buoyancy cavities positioned round the spine axis which are filled with liquid as desired to make the elements take up the desired position in the sea.

Such cylindrical bodies experience a venturi effect arising from the motion of the sea around the spine which tends to drag the spine down into the sea, which can be advantageous.

The ducks may be connected to the respective elements 10 at sea whilst the elements are interconnected as shown in FIG. 1. For the connection of each duck to its element 10, the strap portions 38 are released at anchorage points 42, are moved into position partially encircling the elements 10 and then are finally connected by a wrapping of the straps 38 to the position shown in FIGS. 6 and 7 and by securing the anchoring means 42. Connecting the ducks in this manner, is extremely advantageous, because individual ducks may be removed for repair and replacement, and as these ducks carry the power generating assemblies, then such power means can be serviced readily on land, without having to dismantle the spine.

In the practical example given above, the spine elements may be of the order of 30' in diameter, the length of the element 10 may be 18 meters, and the elements may reach a deflection of one degree upon the adjacent edge of adjacent spine elements moving apart by 3" to arrive at the position equivalent to deflection P shown in FIG. 5A.

Other forms of spring coupling to give the characteristic indicated in FIG. 5A may be used. For example, it may be possible to use disc springs, fibre springs or parallelogram linkages, spring loaded to resist the normal bending loading but yieldable substantially beyond a predetermined loading.

Referring now to FIGS. 8 to 12, in the FIGS. 8 and 9 there is shown in arrangement similar to FIGS. 4 and 5, a modified form of spine element construction, and FIG. 10 shows the mounting of a duck on such spine element construction. The spine elements in the example illustrated in FIGS. 8 and 9 are hexagonal drums or shells which are pressed end to end by tension cables, and in FIG. 8 three aligned spine elements are each represented by the reference numeral 60 and the tension cables which pass through the elements by numeral 62. The spine elements 60 although shown separated for clarity are in use interconnected at their adjacent peripheries by means of knuckle joints 64.

In this example, adjacent shells 60 are interconnected by three knuckle joints 64, these joints being equiangularly spaced relative to the axis of the spine and each joint being of the form shown in FIGS. 8 and 9 wherein it will be seen that each joint comprises a triangular structure of three socket bars 66 and a triangular structure of the tongue bars 68, the socket bars 66 each having a generally triangularly sectioned groove in which the tongue bars 68 of corresponding sectional shape are respectively accommodated. Said groove is lined at its base with a steel liner 70 and the corresponding bar 68 has a similar liner 71 on its tip. It is to be noticed that the bar 68 in normal use bears on the inner face of groove 70 and is clear of the outer side so as to give each bar 68 a degree of tilting freedom relative to the socket bar in which it is located. This is to enable adjacent shells 60 to tilt one relative to the other in the event of more than a pre-set loading being applied on the spine as explained hereinbefore. Thus, considering one of the junctions between adjacent elements, the elements can tilt in any one of the three relative directions normal to each side of the triangle defined by bars 66, 68 upon appropriate loading of the spine. In each case, as the spine is loaded, it must initially overcome the pre-tension applied by the cables 62, and when the pre-tension is overcome, the spine will tend to move into the tilted position without much further loading. This is the desired characteristic of a spine of this nature as explained herein. It must not yield or tilt under any loading but when excess wave motions or sea conditions are being experienced by the spine, it must yield if it is not be seriously damaged.

In this example, the notional equilateral triangle of respective couplings lengthwise of the spine are angularly staggered by 60° so that alternate joints are axially in alignment. Because of the provision of this staggering, the elements of the spine can in effect tilt in any one of six directions respectively normal to the various angular sides of the equilateral triangles defined by bars 66, 68 at each junction.

This gives the spine freedom of flexure under excess loading, virtually in any direction, which is extremely desirable.

It is to be appreciated that a larger number of knuckle joints can be used as desired, and the angular staggering can be eliminated or varied depending upon design and other conditions.

Instead of the bar knuckle joint axes between adjacent spine elements defining a triangle, they could be arranged to define other geometric forms such as a square, polygon and so on.

The shell elements may be made of concrete or any other suitable material, and may be provided with a central ballast block if desired.

Figure 11:
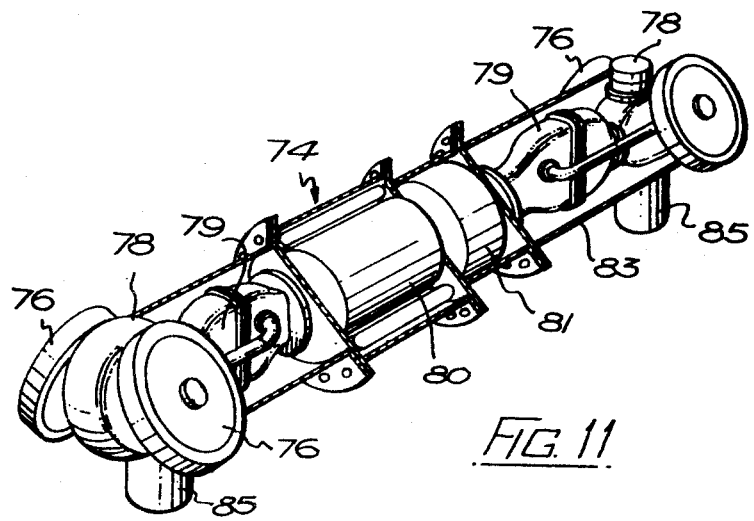
FIG. 11 is a perspective view showing one of the power conversion units used in the spine of which a section is shown in FIG. 10.
Figure 12:
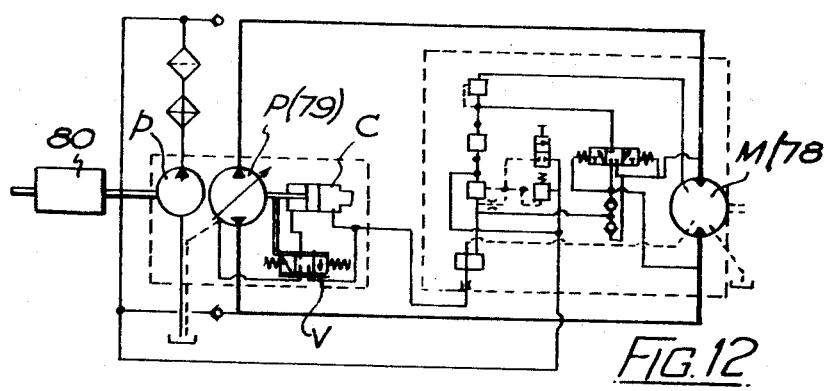
FIGS. 12 and 12A show the hydraulic circuits of a manually controllable hydrostatic transmission and a portion of the transmission shown in FIG. 12 as modified for use with the embodiments of the invention to be described.
Figure 12A:
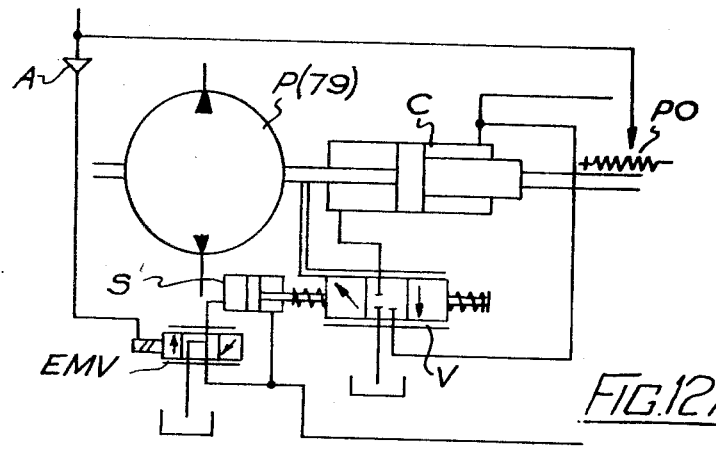

FIGS. 10, 11 and 12 show how the power is derived from the bobbing motion of each duck which is carried by a spine element such as shown in FIGS. 8 and 10. In FIG. 8, a duck is shown at 72 and the same duck is shown in FIG. 10. The duck is supported at the ends of each spine element whereat there is provided on each of the hexagonal faces of the element, a power assembly 74. Each assembly 74 has rubber tyred roller elements on which the duck is rotatably mounted. The roller elements are shown clearly at 76 in FIG. 10, and if reference is made to FIG. 11 a power unit is shown in more detail. It will be seen that there are four roller elements 76 which are in the form of rollers arranged in pairs. Each pair has the rollers mounted on mutually inclined axes, so that the roller pairs engage mutually inclined races on the interior bearing face of the duck, and the duck is indeed rockably supported by the rollers 76. The rollers 76 are respectively drivingly connected in pairs to two pump units 78, and the pumps in turn drive through respective variable displacement motors 79 to an electrical alternator generator 80 from which electrical power is derived and led away by cable preferably extending lengthwise of the spine. Each of the pump motor pairs is a hydrostatic transmission and each pump can be moved selectively from a position of zero discharge to a position of discharge by remote control. There is also a flywheel 81 between one of the motors 79 and the alternator/generator 80. It will be appreciated that each spine element has twelve of these assemblies 74 and they may be made operative selectively or automatically depending upon the particular wave conditions prevailing at any particular time.

Each power assembly 74 has a chassis 83 and support dowels 85. The dowels locate in rubber support rings and in apertures 87 (FIG. 8) in the spine element. Spring means react on the underside of the dowels to press the assemblies 74 into firm frictional engagement with the duck. Such spring means may be springs or fluid pressure rams.

Referring now to FIG. 12 of the drawings, the circuit diagram is of a swash plate pump hydrostatic transmission which is manually controllable. In normal use the pump P and a boost pump p are driven by a prime mover such as an internal combustion engine. The pump is hydraulically connected to the motor M which in turn provides mechanical power output. The transmission has a manually operable servo unit comprising a servo valve V which is manually operable and a swash plate adjustment cylinder C. In operation displacement of valve V in one direction or the other causes pressurisation of cylinder C to tilt the swash plate of pump P in the appropriate direction and there is a discharge from pump P to drive motor M. As the swash plate is tilted so the valve V is moved back to the neutral position and further tilting of the swash plate of the pump is prevented as long as the valve is held in that position.

Each of the hydrostatic transmissions of the power unit of FIG. 11 is of the nature described in relation to FIG. 12, except that the motor is in fact the appropriate pump 78 and the pump P is the variable discharge motor 79. In FIG. 12 the items P and M therefore leave the additional references 78 and 79 as indicating pump and motor respectively. Also, the alternator generator 80 has been indicated in FIG. 12. The hydrostatic transmissions used in power units 74 are not manually operable as described above (although they could be) and the servo unit is remotely and automatically controlled as will be explained herein. The circuitry which is used is illustrated in FIG. 12 and it will be seen that the servo valve V is operated by a slave cylinder S which is in turn under the control of the electromagnetic valve EMV controlled electrically from amplifier A, the input of which is modified depending upon the swash plate position by potentiometer PO. Upon application of the appropriate electrical signal on EMV, this is positioned to displace cylinder S and valve V to the right or to the left and the swash plate of 79 is adjusted as before.

When the system is being used as many of the power assemblies 74 of the spine are made operative either by selection or automatically depending upon the energy available in the waves at any particular time and of each assembly which is operative, the alternator/generator is constantly rotating. Normally, when the duck is at top dead centre or bottom dead centre, the swash plate of motor 79 will be set to zero tilt. Assume that the duck is in bottom dead centre position and it encounters a wave. Basically, the duck will be designed as regards its inertia for the average wave conditions and if it is assumed that such wave is an average wave approximately half of the energy available in the wave goes into raising the duck and the other half is available for extraction as the duck rocks downwards giving up the potential energy stored in raising the duck. As it starts to lift from bottom dead centre, with the increase in pressure at the pump discharge, the swash plates of the motors 79 are automatically tilted by the servo unit and the motors 79 drive the generator to give output electrical power. The swash plate angle increases up to a maximum and goes back to zero as the duck lifts from bottom dead centre to top dead centre and when the duck falls during the second half of the cycle, when it gives up its energy the process is repeated, except that the pumps rotate in the opposite direction and the motor swash plates are tilted in the opposite direction, although the motors continue to rotate in the same directions. Thus the wave energy is extracted as electrical power; half on the upswings of the duck and the other half on the downswing.

As mentioned earlier the duck will be designed to operate most efficiently in average wave conditions. It is also possible to modify the ducks 1 apparent characteristics so that it will operate at good efficiency over a band of wave frequencies. This can be done by controlling the loading on the duck using the hydrostatic transmissions of the units 74. A change of effective loading on the duck has the effect of making the duck appear to have more or less inertia, at least as far as what the waves see is concerned.

The control can be effected by superimposing an electrical control signal, which may be representative of the force on the duck and/or the velocity of the duck, such electrical signal being applied to the valve EMV through amplifier A to modify the positioning of the swash plate of motor 79, from what it would otherwise be, during the swing of the duck so as to time it to the wave motion experienced by the duck at the particular time. Where the electrical signal is representative of duck force and/or velocity such signal may be derived from the output of a pressure sensitive transducer responsive to the pump or system pressure and/or the output of a tachogenerator connected to the duck. The swash plate angle of the motors may be modified to such an extent by this control that the motor may be overdriven to act as a pump causing the connected pump to act as a motor and actually drive the duck.

Figure 13:
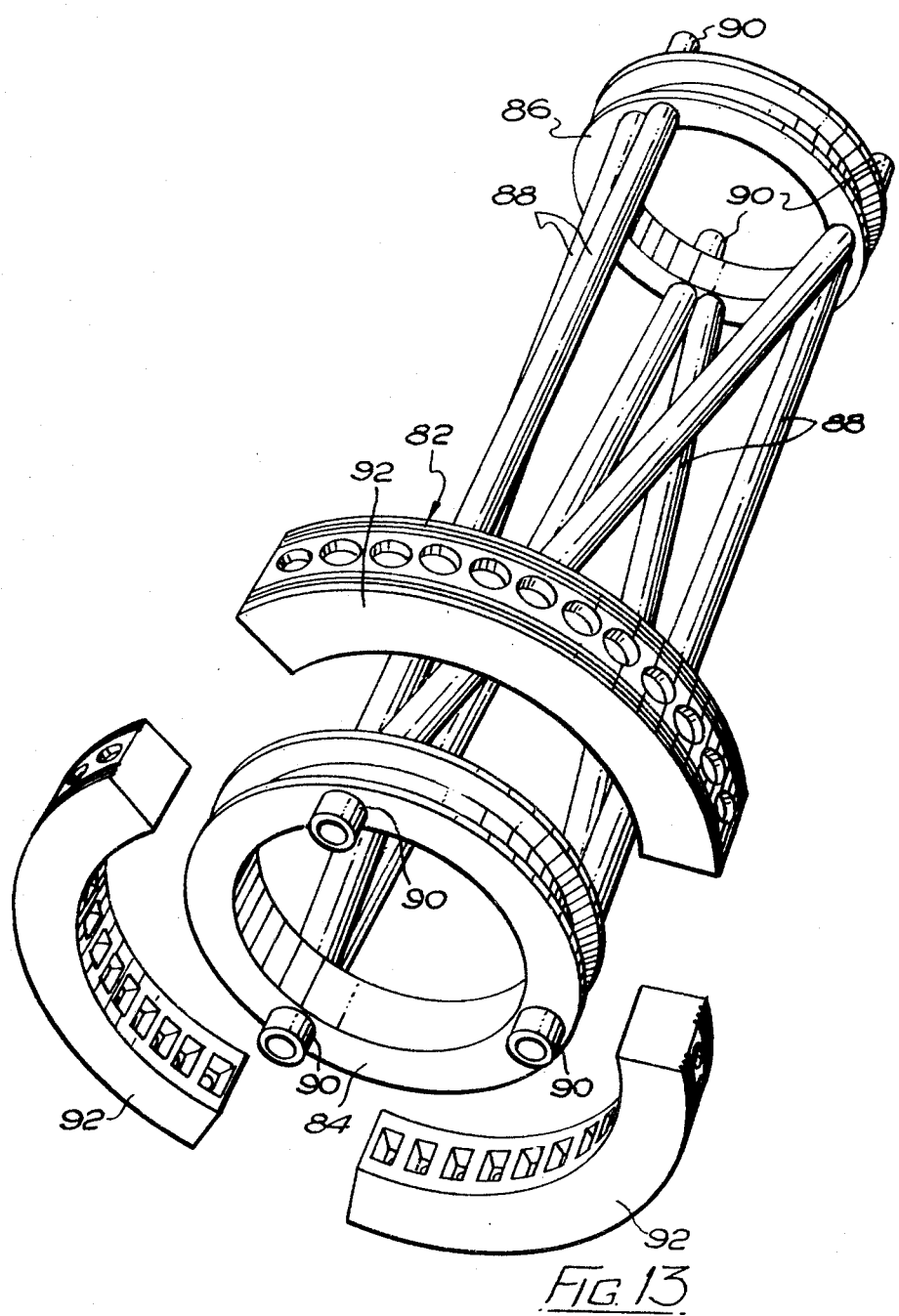
FIG. 13 is a perspective view of a spine element of a spine of modified construction and also shows a modified means of supporting the power generation assemblies.

Referring now to FIG. 13 the drawings, in this Fig, there is shown a spine element 82 which comprises basically two end rings 84 and 86 which are interconnected by connecting bars 88. These bars 88 lie generally axially of the spine element 82 but are inclined alternately and in opposite directions relative to the axis, so as to provide torsional rigidity within the spine element. Each ring 84, 86 is provided on its outer end face with three equiangularly spaced sockets 90 or corresponding knuckles for engaging in the sockets of an adjacent spine element as described hereinbefore.

The complete unit will be made up of a plurality of spine elements such as element 82 arranged end to end with the knuckles of one element in the sockets 90 of the adjacent element. The elements are held together by means of tension cables extending centrally through the spine. This construction enables flexing of the spine which is necessary for example in high seas in order to avoid excessive stress on the spine as explained hereinbefore.

Each element 82 as stated herein is adapted to support a duck, and in this example each duck includes two segmental rings, one only of which is shown in FIG. 13 and each of which is made up of three equal segments 92. In use, these segments fit neatly relative to the associated ring 84 or 86 and are rotatable thereon as will be explained hereinafter. The segments 92 are held in such position by means of high tension cables wrapped around the periphery thereof. The cables can be seen at 94 in FIG. 14 and it will be seen that these cables engage in appropriate grooves provided on the outer surface of these segments 92.

Figure 14:
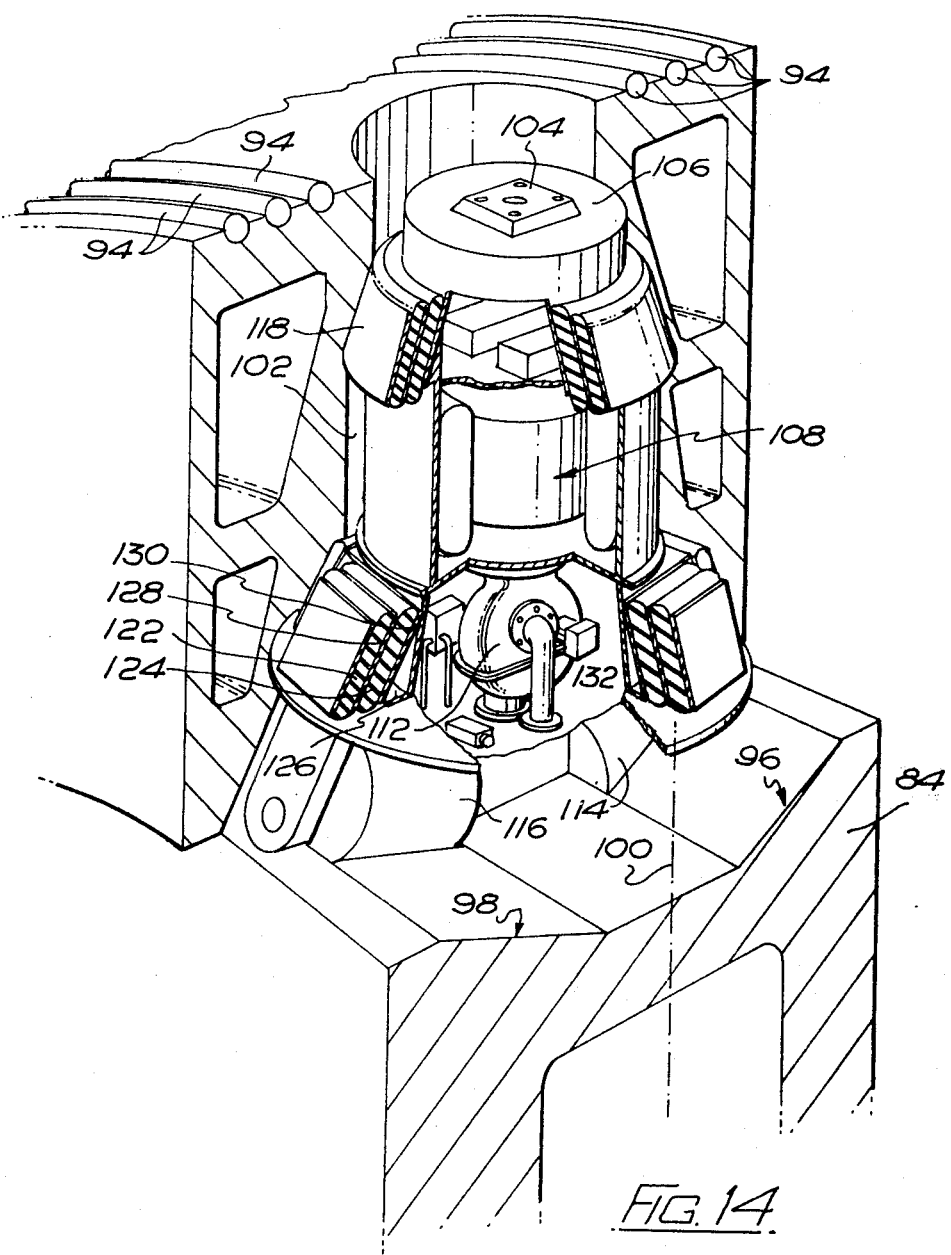
FIG. 14 is a sectional and perspective view showing one of the assemblies of the arrangement shown in FIG. 13.

Referring to FIG. 14, the outer surface of the ring 84 or 86 is shown and it will be seen that this defines a pair of inclined races 96 and 98 inclined oppositely and lying symmetrically to a central radial plane 100. Each of the segments 92 is provided with a plurality of equally spaced and radially extending cavities or pockets 102 into each of which is inserted a plug-in power assembly for the generation of the power from the system as a whole.

Each plug-in power assembly as can be seen clearly in FIG. 14 comprises an in-put terminal 104 as rectifier and control unit 106, a synchronous generator 108, gearing transmission 110 comprising a epicyclic gear and a flywheel, a variable output hydraulic motor/pump 112 and two variable output hydraulic swash plate pumps/motor 114 and 116 of which the rotors respectively engage and run upon the races 96 and 98 as shown in FIG. 14.

The plug-in unit is held in position in the cavity 102 by means of an outer rubber bearing ring 118 and an inner bearing ring unit 120. Unit 120 comprises a plurality of thin rubber rings 122, 124 and 126 between which are sandwiched metal rings 128 and 130. This construction provides a bearing unit which is resistant to compression in a radial direction, but permits a considerable degree of axial relative movement. The rings 122, 124 and 126 and 128 and 130 are generally of frusto-conical shape.

The advantage of having plug-in assemblies as described is that any one can be removed for repair or replacement as desired.

The assemblies of FIGS. 13 and 14 operate in the same manner as those described in relation to FIGS. 11 and 12.

By using the control arrangement for the hydrostatic transmission as described, radar can be used to detect oncoming waves and the control system can be programmed accordingly. In this case, the assembly of spine elements may be provided with radar sensors which detect the magnitude of the oncoming waves and in turn deliver programmed input signals to amplifier of each of the assemblies to programme it to operate at maximum efficiency or as near such efficiency as possible.

I claim:

1. A power generation system for the generation of electrical power from the wave motions of the sea comprising a spine on which a plurality of ducks are rockably mounted and for each duck a power generation assembly comprising a hydrostatic transmission known per se having a pump connected operatively with a drive wheel means which is rotated back and forth by the rocking motion of the duck, caused by the wave motions of the sea, a variable displacement hydraulic motor hydraulically coupled to the pump so as to be driven by the pump, an electrical generator operatively connected to the motor to be driven thereby so as to provide output electrical power, and sensing means for sensing the force or velocity condition of a duck for varying the motor displacement in accordance with such condition.

2. A power generation system according to claim 1 wherein a plurality of said power assemblies are associated with each duck and the duck is rockably mounted on the spine through said drive wheel means.

3. A power generation system according to claim 2 wherein the power assemblies of each duck are respectively held in cavities of a ring formed in segments and held together by circumferentially extending cables.

4. A power generation system according to claim 1 wherein each power generation assembly has a rectifier operatively connected to the generator for converting a.c. electrical output from the generator to d.c. for transmission along the spine.

5. A power generation system according to claim 1 wherein each power assembly comprises two pumps and two hydraulic motors to which the pumps are respectively hydraulically connected and the motors respectively are connected to the opposite ends of the armature shaft of the electrical generator to drive same.

6. A power generation unit according to claim 4 wherein each assembly has a chassis carried by the spine and is urged radially outwards of the spine so that rotors connecting the pumps are urged into engagement with races formed on the duck with which the assembly is associated to thereby rockably support the duck.

7. A power generation unit according to claim 5 wherein each pump has two rotors lying on mutually inclined axes and respectively engaging two races on the duck having mutually inclined race surfaces.

8. A power generation system according to claim 4 wherein the spine has lengths of hexagonal section on each of which is carried a duck, and there is power assembly on each hexagonal face at the end of each hexagonal length so that each duck is supported at each of the ends by six power assemblies.

* * * * *